P. BALL & B. FITTS.
Measuring Water from Large Mains and Testing the Meters.
No. 155,280. Patented Sept. 22, 1874.
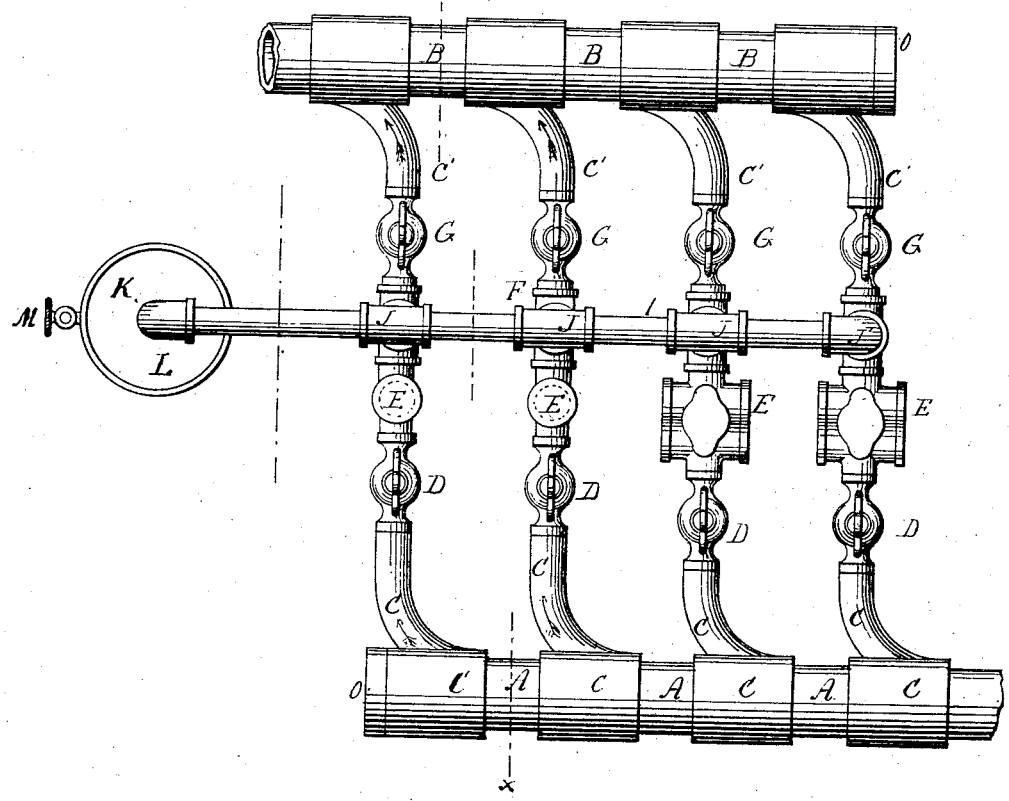
FIG. I.
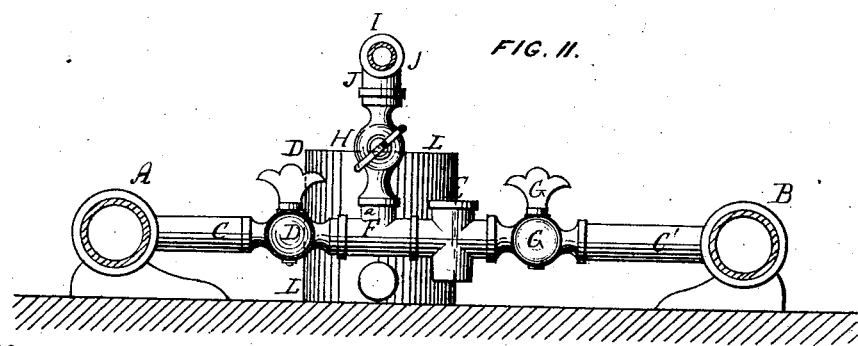
FIG. II.
WITNESSES:
A. G. Stuart
J. Y. Knight
INVENTORS:
Phinehas Ball
and Benaiah Fitts
per P. Hannay
Attorney

UNITED STATES PATENT OFFICE.

PHINEHAS BALL AND BENAIAH FITTS, OF WORCESTER, MASS., ASSIGNORS TO THE UNION WATER-METER COMPANY, OF SAME PLACE.

IMPROVEMENT IN MEASURING WATER FROM LARGE MAINS, AND IN TESTING THE METERS.

Specification forming part of Letters Patent No. 155,280, dated September 22, 1874; application filed August 1, 1874.

*To all whom it may concern:*

Be it known that we, PHINEHAS BALL and BENAIAH FITTS, of Worcester, in the county of Worcester and State of Massachusetts, have invented a certain new and Improved Mode of Measuring Water from Mains of large Capacity, and of Testing the Accuracy of the Meters; and we do hereby declare that the following is a full, clear, and exact description thereof, which will enable others skilled in the art to which it pertains to make and use the same, reference being had to the accompanying drawings, and to the letters of reference marked thereon, which form a part of this specification, in which—

Figure 1 represents a plan of our improvement as applied to two water-mains, the one leading from the source of supply and the other to the city or place supplied; and Fig. 2, a section of the same through the line $x\ x$ of Fig. 1, looking toward the measuring-tank.

Our improvements relate to a new and improved mode of measuring the quantity of water delivered by a supply main or mains to the distributing main or mains which supply the service-pipes, whereby the quantity delivered can be more accurately measured than in the old way, and whereby, in the event that either of the meters should become deranged and fail to operate or accurately record the quantity of water passing through the same, the water may be cut off therefrom and it removed for repairs or else replaced by another. Our invention also relates to a new and improved arrangement of devices, whereby any one singly, or two or more or all of the meters together may be tested as to their accuracy when required.

Our invention for these purposes consists, first, in combining with any two water-mains, from the one of which the water is supplied to the other, two or more water-meters, the induction and eduction pipes of which are, respectively, provided with stop-cocks that the water may be cut off from either or both mains at will for any reason or purpose whatsoever; and, secondly, it consists in combining, with a series of meters thus connected with two mains, a measuring-tank, and a pipe leading thereto and suitably connected with the eduction-port of each meter, the connection between each port and the pipe being made through the instrumentality of a short communicating-pipe provided with a stop-cock, in order to turn on or cut off communication with the meters whenever it is desired so to do.

To enable others skilled in the art to make, construct, and use my invention, I will now proceed to describe it in detail.

In the drawings, A represents a section of a main pipe leading from the source of supply; and B, a similar section of the main pipe which supplies the water to the distributing-pipes of the city to be provided with water. Each of these sections A and B are represented as being provided with a cap or plug, O, at their terminal end adjoining the meters, and with a series of tubular elbows, C C', which may be either cast in one piece with the mains or formed separately and afterward accurately fitted thereon, suitable openings in the side of the mains being made in order to form a communication with the outlet or inlet opening of the tubular elbows C C'. When each elbow is made separate and fitted on the mains care must be taken that their joint may be fitted accurately or be otherwise properly packed in order to render their joint perfectly water-tight. To the ends of each of the elbows C is secured the one end of a stop-cock, D, the other end of which is fitted and secured to the induction-opening of a meter, E, the eduction-port of each of which is connected with a short inverted T-shaped pipe, F. The other end of each pipe F is then connected with one of the elbow-pipes C' of the distributing-main B by means of stop-cocks G, thereby connecting the meters E with the mains A and B in such manner that all the water passing from the supply-main A to the distributing-main B must pass through the meters E, and thus record or register the quantity of water delivered from the one to the other.

With reference to the meters E, they may be made of any suitable or desirable construction, and so as to operate on any known principle, the peculiar construction of the meters not forming any branch of this invention.

Each of the inverted T-shaped pipes F has the lower end of a stop-cock, H, connected to its arm or elbow a. The upper end of each stop-cock H is then connected to a pipe, I, in any suitable manner, such as a T-shaped elbow-pipe, J, fitted or cast thereon. In the case of the last or outer stop-cock H, a simple elbow-joint, J', may be used, the end of pipe I being fitted into its upper arm. The front end of pipe I is fitted with a mouth, K, bent down so as to guide the discharge of the water into the measuring-tank L, or it may be cast thereon, or, if made of wrought-iron, formed by bending its end down. Tank L may be made of any given capacity, and is provided with a stop or faucet, M, at its bottom for its discharge after the water has been measured.

The operation is as follows: All the meters E being used to supply measured water from supply-main A to distributing-main B, stop-cocks D and G will be turned, as shown in Fig. 1. Then when, for any reason whatever, it becomes desirable to repair either of the meters, the same stop-cocks D and G which communicate with that meter are turned round so as to close all passage from either main through the stop-cocks, and the meter then detached from cock D and inverted T-shaped pipe F. For this purpose the connection between the meter and cock D and pipe F may be made by screw-bolts and nuts passing through suitable flanges formed thereon and properly packed, or in any other suitable manner which will enable them to be readily detached the one from the other. Again, when it is desired to test the accuracy of any of the meters, stop-cock G is turned so as to cut off all communication between the meter and distributing-main B. Stop-cock H is then turned so as to open communication with pipe I. This allows the water passing through that meter to flow through pipe I and discharge through mouth K into tank L. As soon as the latter is filled stop H is then turned to cut off communication with pipe I, and the state of the meter then taken; and from this is deducted the state of the meter taken just previous to the passage of the water through pipe I immediately after cock G has been turned off and before stop H is turned on. The difference will be the amount of water passing through the meter as registered by itself, and should correspond, if measuring accurately, with the quantity of water as measured by the tank, (at least within a very trifle, the meter, if anything, registering a trifle more for the water remaining in pipe I and connecting-pipe J;) otherwise the meter is not registering accurately, and should be removed for readjustment, or repairs, if necessary; and so, in the same way, by turning the necessary cocks any two or more of the meters may be tested simultaneously to see if they register correctly when operating together.

Having thus described our invention, what we claim as new, and desire to secure by Letters Patent, is—

1. The combination of two or more meters, E, and their respective stop-cocks D and G with the supply-main A and distributing-main B, substantially as and for the purpose specified.

2. The combination of the pipe I and tank L with the eduction-ports of two or more meters, E, arranged to measure the quantity of water passing from a supply-main, A, to the distributing-main B, substantially as and for the purpose specified.

In testimony that we claim the foregoing as our own invention, we hereto affix our signatures in presence of two witnesses.

PHINEHAS BALL.
BENAIAH FITTS.

Witnesses:
ABIEL E. WILSON,
E. C. CRANE.